United States Patent [19]

Ghose et al.

[11] Patent Number: 4,466,131
[45] Date of Patent: Aug. 14, 1984

[54] AUTOMATIC SEPARATION SYSTEM

[75] Inventors: Rabindra N. Ghose, Los Angeles; Walter A. Sauter, Malibu, both of Calif.

[73] Assignee: 501 American Nucleonics Corporation, West Lake Village, Calif.

[21] Appl. No.: 427,633

[22] Filed: Sep. 29, 1982

[51] Int. Cl.³ .............................................. H04B 1/10
[52] U.S. Cl. ..................................... 455/278; 455/60; 455/295; 455/305
[58] Field of Search ............... 455/273, 278, 295, 303, 455/304, 305, 306, 60, 63, 65; 343/100 PE; 370/6

[56] References Cited

U.S. PATENT DOCUMENTS

| 4,090,137 | 5/1978 | Soma et al. | 455/295 |
| 4,220,923 | 9/1980 | Pelchat et al. | 455/295 |
| 4,310,813 | 1/1982 | Yuuki et al. | |
| 4,335,394 | 6/1982 | Warren | 455/295 |

FOREIGN PATENT DOCUMENTS 2441889  3/1976  Fed. Rep. of Germany ...... 455/295

OTHER PUBLICATIONS

"A New Adaptive Control System for Compensating Crosspolarization-couplings on the Up and/or Down Path in Frequency Reuse Satellite Communication Systems"-Makino et al., Apr. 20-24, 1980, AIAA 8th Communications Satellite Systems Conference, Orlando, FL, USA, pp. 280-289.

Primary Examiner—Marc E. Bookbinder
Attorney, Agent, or Firm—Wagner & Bachand

[57] ABSTRACT

The present invention is a method and apparatus for separating a plurality of radio frequency signals, comprising N number of signal collectors, each signal collector receiving the plurality of signals from a location different than the other signal collectors, and N being an integer from 2 to infinity; N number of transmission means, each transmission means conducting the signals received from one signal collector; and, N (N−1) number of signal cancellation means, each signal cancellation means having reference, error input and output lines, the reference line coupled to one transmission means and the error and output lines coupled to another transmission means; the signal cancellation means and transmission means being interconnected so that each transmission means is coupled to the output and error lines of N−1 signal cancellation means and the reference line of N−1 other signal cancellation means, and no signal cancellation means having the same transmission means coupled to their output and reference line; each signal cancellation means substantially nulling in the transmission means couled to its output line a predominant signal appearing in its reference line, thus defining a different predominant signal in the transmission means coupled to the output line of the signal cancellation means; thus, the signal cancellation means substantially null out N−1 signals from each transmission means.

17 Claims, 4 Drawing Figures

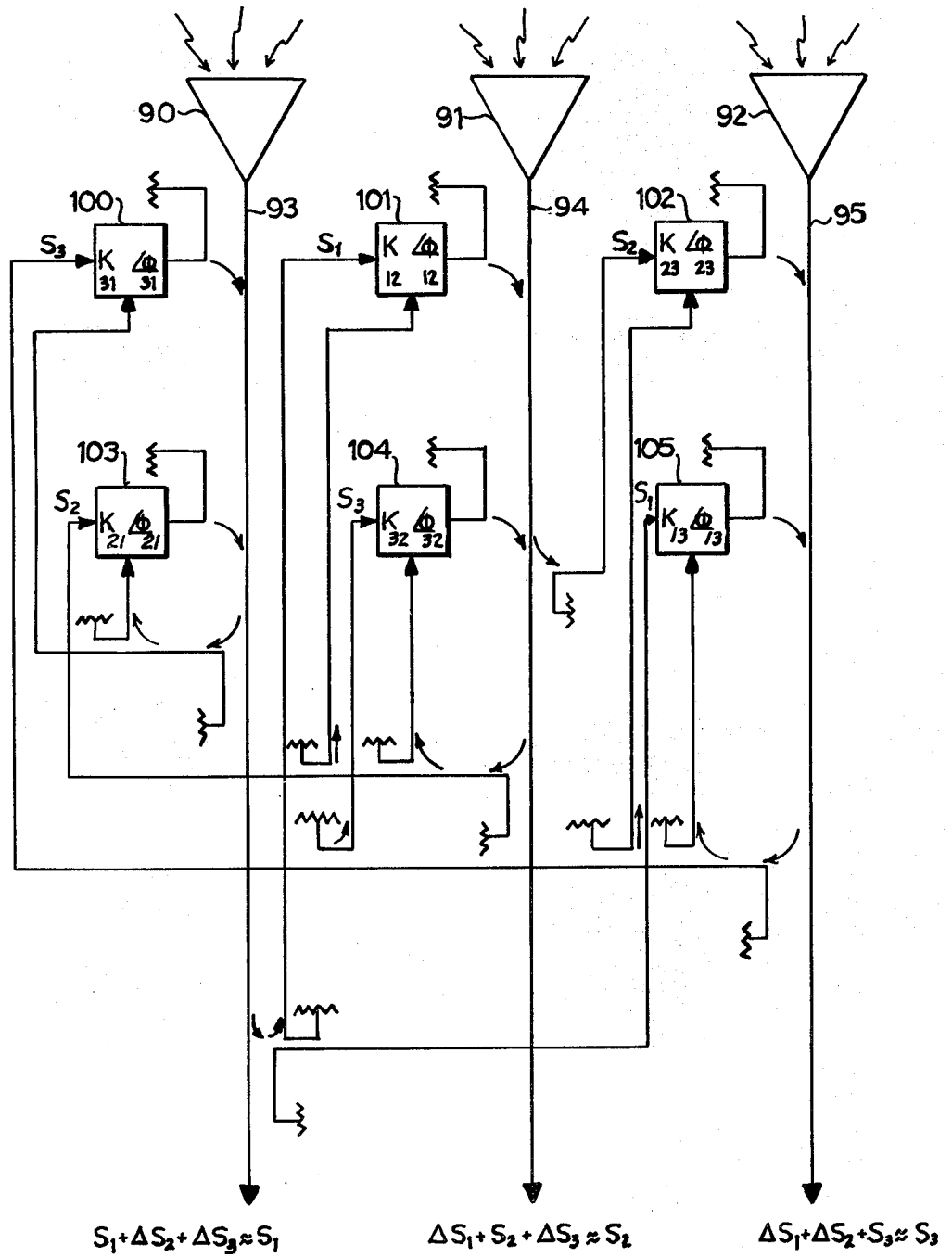

AUTOMATIC SEPARATION SYSTEM

BACKGROUND OF THE INVENTION

The present invention relates to radio signal separation systems and more particularly to signal separation systems which can separate a plurality of signals from any arbitrary group of signals received by an antenna system.

Existing signal nulling systems that have been developed include the interference cancellation system for eliminating interference in radio receivers as found in U.S. Pat. No. 3,669,444 to the present inventors R. N. Ghose and Walter Sauter. The interference cancellation system of the aforementioned patent allows simultaneous transmit and receive on the same radio frequency from adjacent antennas without interference. In that system, it was necessary to cancel out the unwanted transmitter signal from the received signal and, hence, allow full duplex radio transmissions on a single frequency or any adjacent frequencies. Briefly, employing the system of U.S. Pat. No. 3,669,444, when it is connected in the line between the radio receiver and its antenna, the system will sense the interferring signal and generate a signal which is the negative compliment of the interferring signal. The negative compliment signal is added to the radio receiver antenna line to cancel out the interferring signal.

The above described interference cancellation system uses signal controllers as part of the signal separation system. Prior art known to the applicants disclosing signal controllers include U.S. Pat. No. 4,016,516 to W. Sauter and U.S. Pat. No. 3,648,176 to D. Martin. The signal controller disclosed in the aforementioned Sauter 516 patent uses semiconductors and is designed to be inserted into an RF transmission line to control the signal amplitude ratio and polarity by an external DC voltage control means. U.S. Pat. No. 3,648,176 discloses a signal controller to cancel out unwanted signals by employing an RF potientiometer directly coupled to a drive motor and a velocity generator whereby corrections in potentiometer ratios may be made automatically by driving the motor via a feedback loop.

None of the foregoing art references are able to separate out more than one signal from a group of individual signals received by an antenna system. Consequently, a need continued to exist for a signal separation system which can separate a number of individual signals from external interferences and from each other.

BRIEF DESCRIPTION OF THE INVENTION

A general object of the present invention is to be able to separate out a plurality of individual RF signals from any arbitrary group of individual RF signals received at an antenna system when the characteristics of the individual signals including direction, frequency and modulation are not a prior known.

The present invention, in order to completely separate a plurality of signals into a plurality of separate transmission lines utilizes signal cancellation units which cooperate in a latching arrangement where the largest signal in each antenna line is used as a reference to null this largest signal from the other antenna line. To illustrate the present invention a two signal separation system will be described.

The two signal embodiment has two antennas, two transmission lines and two signal cancellation units. Each cancellation unit is of the type which uses a control loop to null in an output transmission line the largest signal appearing at its input. It may be assummed that at the instant of turn-on of the system, a first signal $S_1$ of two signals appearing at a first antenna is greater than another signal $S_2$. $S_1$ will be used as a reference in a control loop of a first signal cancellation unit to generate a negative compliment of $S_1$ which is added to the second antenna line. As the first control loop reaches equilibrium, $S_1$ will approach zero at the second antenna. As $S_1$ approaches zero at the second antenna, $S_2$, the previously weaker of the two signals in the first antenna line, becomes the greater of the two signals in the second antenna line. At this point, the second signal cancellation unit and its control loop uses $S_2$ from the second antenna line as a reference to generate a negative compliment of $S_2$ which is added to the first antenna line. $S_2$ then approaches zero in the first antenna line. Therefore, when the present invention reaches an equilibrium, only $S_1$ will be in the first antenna line and only $S_2$ will be in the second antenna line.

This latching arrangement of the present invention can be extended to separate any number N of signals into N number of separate transmission lines using N number of antennas and $N(N-1)$ signal cancellation units. Therefore, the present invention has achieved its goal of being able to separate any number of signals into separate transmission lines.

BRIEF DESCRIPTION OF THE DRAWINGS

FIG. 4 is an electrical block diagram of a three signal separation embodiment of the present invention.

DETAILED DESCRIPTION OF THE INVENTION

Many times it is desirable that several signals of the same frequency spectrum received by an antenna system be separated and the characteristics (such as direction, frequency, modulation etc.) of the undesired and the desired signals be ascertained. In certain cases, so long as the signals come from different directions, one can employ a conventional nulling system to suppress the undesired signal. However, conventional signal nulling systems are incapable of accomplishing the separation required when directional antennas or other means for selecting one of the signals are not feasible.

The present invention separates completely and preserves intact any number of arbitrary signals even when the spectral characteristics of such signals (such as their amplitudes, frequencies and modulations) are similar and not apriori known. The following is a discussion of one prior art nulling system with a discussion of the present invention to follow thereafter.

Figure 1:
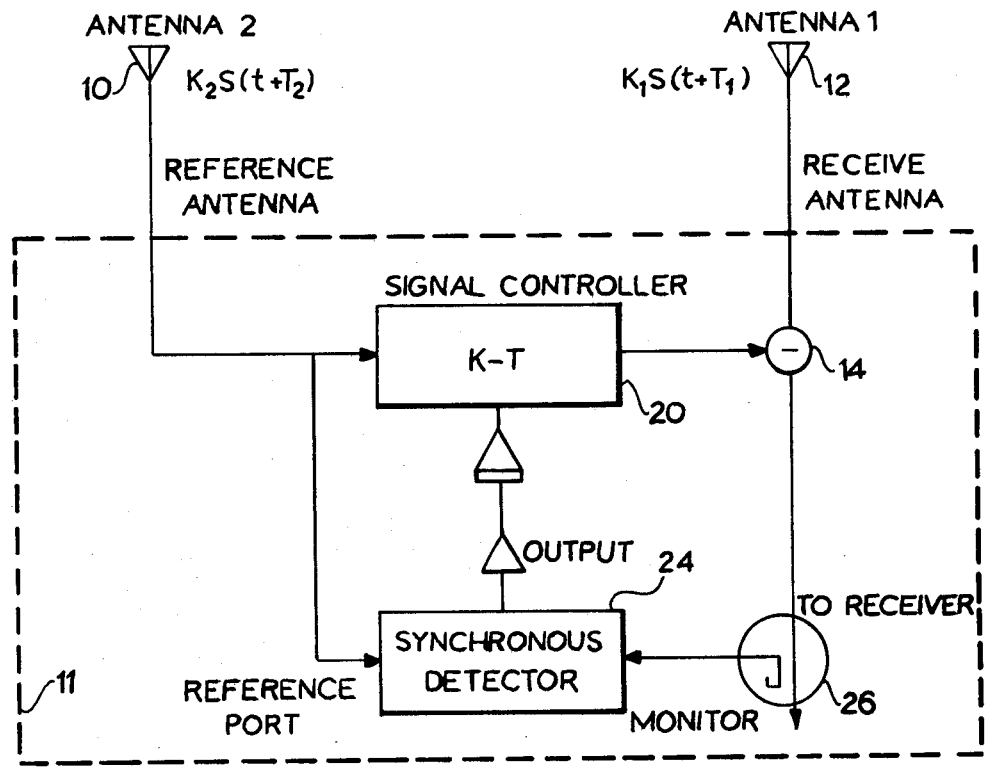
FIG. 1 is an electrical block diagram of a conventional signal cancellation device showing a signal controller controlled by a synchronous detector which references both antenna lines to develop an error signal to the signal controller.

FIG. 1 is a block electrical schematic diagram of an interference cancellation system of the type disclosed in U.S. Pat. No. 3,669,444. The system employs a single signal cancellation unit 11. An antenna 12 is a receiving antenna which receives two signals, one of which is an undesired signal. The antenna 10, termed a reference antenna, receives the same two signals except that it receives the undesired signal predominantly.

Let it be assumed that the undesired signal $S^{(t)}$ is received at antenna 10 with some amplitude-gain and time delay different from the same undesired signal received at antenna 12. Let the ratio of the amplitudes $K_1$ and $K_2$ of the undesired signals as received by the two antennas be K and the differential time delay $T_1-T_2$ be T. If the signal received at reference antenna 10 is introduced into a network which compensates for the amplitude-gain factor K and time delay T, then the output of this network will be exactly the same as the undesired signal at antenna 12. The output of this network is then subtracted in a subtractor stage 14 from the signals received at antenna 12 so that a complete cancellation of the undesired signal is accomplished.

The amplitude-gain and time delay factors K and T may properly be incorporated into the signal from antenna 10 in a signal controller 20 which is controlled by a synchronous detector 24. The synchronous detector 24 uses the signal from antenna 10, which contains the undesired signal predominantly, as a reference signal. So long as there is any input to the synchronous detector from the monitor stage 26 which is correlated with the undesired signal from antenna 10, the loop continues to change the amplitude-gain and time delay factors K and T. When the input signal from the monitor stage 26 is zero or nearly zero, the loop reaches an equilibrium. This equilibrium condition represents the required cancellation of the undesired signal $S_{(t)}$ from the antenna 12.

Figure 2:
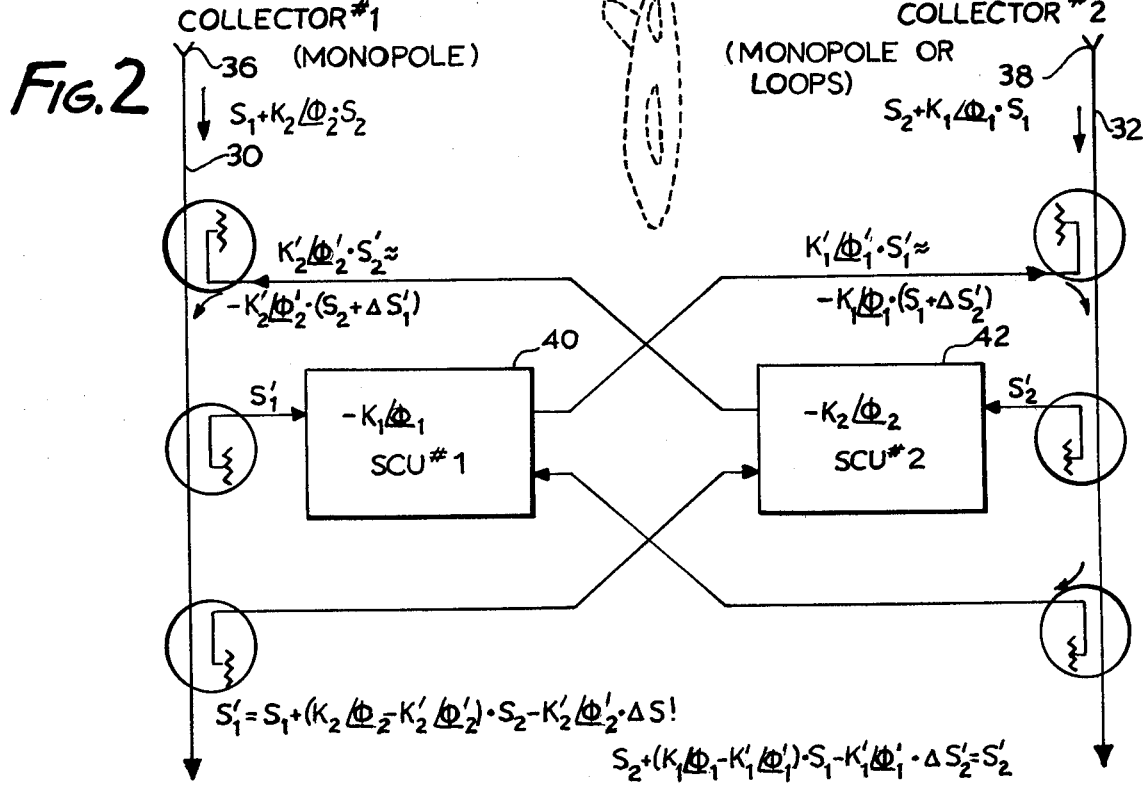
FIG. 2 is an electrical block diagram of the signal separator of the present invention showing two signal cancellation devices in a latching mode of operation.

Referring now to FIG. 2, the present invention utilizes typically two antennas 36 and 38 (in the drawing designated as Collectors #1 and #2), two antenna lines 30 and 32 and two interference cancellation systems 40 and 42 of the type described in U.S. Pat. No. 3,669,444, the disclosure of which is incorporated herein by reference, to suppress a second signal at the remaining antenna line. However, as will be shown later, any N number of signals may be separated with the present invention so long as there are N number of antennas, N number of transmission lines and N(N−1) interference cancellation systems.

The present invention can separate two signals $S_1$ and $S_2$ which can be at any frequency. The two signals are identified as $S_1+K_2\angle\theta_2\cdot S_2$ in line 30 and as $S_2+K_1\angle\theta_1\cdot S_1$ in line 32. The $K_1\angle\theta_1$ and $K_2\angle\theta_2$ terms quantify relative amplitude gains (K) between a pair of antennas or collectors 38 and 36 respectively that occur when the two signals $S_1$ and $S_2$ originate from sources that are separated by finite distances.

A pair of interference cancellation systems 40 and 42 may be a cancellation system which uses a reference and error input and which outputs a signal which when mixed with an antenna line will cause a cancellation of an undesired signal. Such interference cancellation systems should preferably be of the type described in U.S. Pat. No. 3,699,444 issued Oct. 17, 1972 to the present inventors. The function of the interference cancellation systems 40 and 42 is to multiply the largest signal in the reference sample obtained from antenna lines 30 and 32 respectively by the $K\angle\theta$ term required to deliver a cancellation signal into the other line that will null out that signal if it is present in the other line. For example, assuming that the largest signal in antenna line 30 is $S_1$, the interference cancellation system 40 will multiply $S_1$ by a $-K_1\angle\theta_1$ and cancel the $K_1\angle\theta_1\cdot S_1$ signal in antenna line 32 to zero when the adjustment of $-K_1'\angle\theta'_1$ is made with the proper precision. For discussion purposes, all coupler, line losses and phase shifts are included in the control term $K'\angle\theta'$.

The interference cancellation system 42 provides the same function for antenna line 30 as the interference cancellation system 40 does for antenna line 32. The strongest signal in antenna line 32 is $S_2$ after interference cancellation system 40 cancels $S_1$ from antenna line 32. The interference cancellation system 42 multiplies the signal $S_2'$ by $-K_2'\angle\theta_2'$ to deliver a cancellation signal $-K_2'\angle\theta_2'\cdot S_2'$ that will cancel the $K_2\angle\theta_2\cdot S_2$ signal in antenna line 30 to zero when the adjustment of $-K_2'\angle\theta_2'$ is made with the proper precision. Interference cancellation system 40 should continue to increase or decrease $K_1'\angle\theta_1'$ until the residual $S_1'$ error signal at antenna line 30 is zero. Similarly, interference cancellation system 42 should continue to adjust $K_2'\angle\theta_2'$ until the residual $S_2'$ error signal sensed at antenna line 32 is zero.

The required precision can be obtained either by a high resolution manual adjustment for static applications or by high gain control loops in each interference cancellation system 40 and 42 for changing or dynamic applications.

Figure 3:
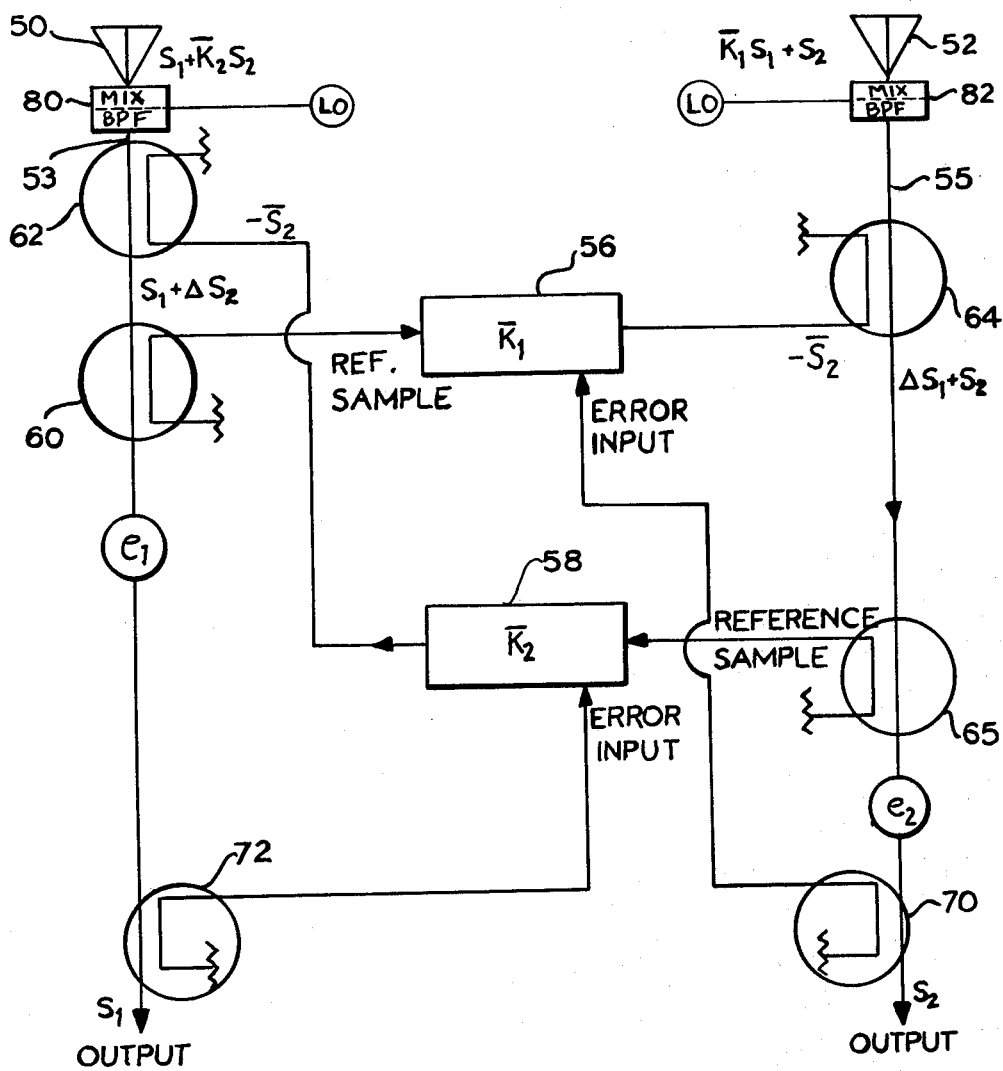
FIG. 3 is a more detailed electrical block diagram of the signal separator of the present invention.

FIG. 3 shows the present invention as two interference cancellation systems 56 and 58 cross-connected to two receiving antennas 50 and 52. The interference cancellation system 56 uses a reference input from coupler 60 and an error input from coupler 70. The interference cancellation system 58 uses a reference input from coupler 65 and an error input from coupler 72. The signals received by the antennas 50 and 52 can be selected to cover a specified bandwidth by being heterodyned and filtered in the conventional converter stages 80 and 82, respectively. The converter stages 80 and 82 may also up-convert or down-convert the signals received at antennas 50 and 52 to any desired intermediate frequency before signal separation. They include a mixer, local oscillator and intermediate (IF) band pass filters.

To better understand the operation of the present invention, one may consider that two signals, $S_1$ and $K_2S_2$, are present in antenna line 53. The same two signals also appear at antenna line 55 in the form of $K_1S_1$ and $S_2$, where $K_1$ and $K_2$ are complex numbers denoting the transfer function of the differential propagation paths from the sources of $S_1$ and $S_2$ and the two antennas 50 and 52. If one assumes that $S_1$ is greater than $S_2$ at the instant of turn-on, the first interference cancellation system 56 with the signal controller parameter $\overline{K}_1$ will tend to cancel or suppress $S_1$ at antenna line 55. Thus, following this cancellation, antenna line 55 will contain $S_2$ predominantly. This predominant $S_2$ interference can be used as a reference in the interference cancellation system 58 to synthesize a cancellation signal corresponding to $K_2S_2$ at antenna line 53. Thus, following the cancellations effected by the two cancellation systems 56 and 58, the output of antenna line 53 will contain only $S_1$ and the output of antenna line 55 will contain only $S_2$.

To illustrate the criteria for simultaneous operations of the two interference cancellation systems, one may write the output of antenna line 55 following the subtraction of the cancellation signal delivered by the interference cancellation system 56 as:

$$e_2 = C_1C_2(S_1 + K_2S_2 - \overline{S}_2)\overline{K}_1 + K_1S_1 + S_2 \quad (1)$$

where $C_1$ and $C_2$ are transfer functions of the couplers 60 and 64 respectively and $\overline{K}_1$ is the complex transfer function of the signal controller of the interference cancellation system 56. Also, $\overline{S}_2$ is the signal which is subtracted from the output of antenna line 53 through the interference cancellation system 58.

Similarly, the output of antenna line 53 following the subtraction of the cancellation signal $S_2$ can be expressed as:

$$e_1 = S_1 + K_2 S_2 + C_3 C_4 (K_1 S_1 + S_2 - \overline{S}_1) \overline{K}_2 \quad (2)$$

where $C_3$ and $C_4$ are the transfer function of the couplers 65 and 62 respectively and $\overline{K}_2$ is the complex transfer function of the signal controller of the interference cancellation system 58. Since the signal $S_2$ is synthesized from the signal $e_2$, one may write:

$$\overline{S}_2 = C_4 C_3 K_1 S_1 + K_2 S_2 - C_1 C_2 (S_1 + S_2 - \overline{S}_2) \overline{K}_1 \overline{K}_2 \quad (3)$$

$$= \frac{\overline{K}_2 C_3 C_4}{1 - A} K_1 S_1 + K_2 S_2 - C_1 C_2 (S_1 + S_2) \overline{K}_1$$

Where $A = C_1 C_2 C_3 C_4 \overline{K}_1 \overline{K}_2$ represents the gain of the loop involving the two interference cancellation systems 56 and 58 and the couplers $C_1 C_2 C_3 C_4$ (60, 64, 65 and 62 respectively), the magnitude of A must be less than 1 to avoid self-oscillation.

The criterion for optimum operation is that $S_1$ should vanish at the output of antenna line 55 following the interference cancellation. In other words, $e_2$, the output of antenna line 55, must not contain the signal $S_1$ when the interference cancellation system 56 has fully performed its function. Collecting the coefficients of $S_1$ from the expression of $e_1$, one may write:

$$K_1 + \overline{K}_1 C_1 C_2 = 0 \quad (4)$$

Thus, $$\overline{K}_1 = -K_1 / C_1 C_2 \quad (5)$$

Similarly, $S_2$ must disappear from the output of antenna line 53 following the interference cancellation by the interference cancellation system 58. Therefore, $S_2$ must not be present in the expression for $e_1$. Collecting the coefficient for $S_2$, this condition may be written as:

$$K_2 C_3 C_4 \overline{K}_2 = 0 \quad (6)$$

Therefore $$\overline{K}_2 = -K_2 / C_3 C_4 \quad (7)$$

Thus, the necessary conditions which must be satisfied for the operation of the two cancellation systems and to avoid an oscillation are:

$$\overline{K}_1 = -K_1 / C_1 C_2$$

$$\overline{K}_2 = -K_2 / C_3 C_4 \quad (8)$$

and $$|\overline{K}_1 \overline{K}_2 C_1 C_2 C_3 C_4| < 1$$

Also, since $\overline{K}_1 \overline{K}_2 = K_1 K_2 / C_1 C_2 C_3 C_4$, the equation involving self-oscillation can be expressed as:

$$|K_1 K_2| < 1 \quad (9)$$

It may be remarked that the limit shown in Equation (9) is adequate to avoid oscillation in the latching mode of operation. This equation also shows that there exists some constraints for the latching mode of interference suppression. For example, if antennas 50 and 52 are both omnidirecitonal vertical dipoles, or monopoles over a ground plane base, it may not always be possible to maintain the relationship given by Equation (9). However, this constraint can be eliminated if, instead of two vertical dipoles, one uses a pair of cross-loop antennas to receive the same polarization as the vertical dipole. For such a case, it can be shown that, unless the desired signal and interference are absolutely co-directional, a $|K_1 K_2| < 1$ condition can be maintained for arbitrary $S_1$ and $S_2$ signals. In other words, for such an antenna, at least one and usually both K terms will be less than unity when the weakest signal in each line is suppressed.

Other means for satisfying Equation (9) are available for obtaining the expected performance from latching mode cancellation. For example, if there are two vertical monopole antennas, one at the top of an airplane fuselage and the other at the bottom, the radiation patterns of the antennas will be dissimilar because of the different scattering effects of the aircraft structure on the two antennas for most of the angles of arrival of signals of concern. Alternately, one can create such a condition by choosing a slightly different antenna at the top with respect to the one at the bottom, without affecting aircraft performance and without requiring aircraft modification. This dissimilarity will permit compliance with Equation (9) and, hence, satisfactory operation of the cancellation system of the present invention in the latching mode.

Referring now to FIG. 4, it may be seen that the present invention may be embodied to separate three or more signals. For purposes of discussion, the three antennas 90, 91 and 92 each receive three signals $S_1$, $S_2$ and $S_3$ where all K values are less than unity. First, when interference cancellation systems 101 and 105 sample antenna line 93 they will use the largest signal, $S_1$, as the signal to subtract from antenna line 94 and 95. Therefore, $S_2$ will be the largest signal in antenna line 94. It is used as the signal to be cancelled in antenna lines 95 and 93 through interference cancellation systems 102 and 103.

Similarly, the residual signal $S_3$ in antenna line 95 is used to cancel $S_3$ in antenna line 94 and 93 through the interference cancellation systems 104 and 100, leaving only $S_2$ remaining in antenna line 94, $S_1$ as the largest signal in antenna line 93, and only $S_3$ in antenna line 95. Thus, each antenna line 93, 94 and 95 has its own separated output signal.

Each of antennas 90, 91 and 92 receives signals $S_1$, $S_2$ and $S_3$ from a different position, thereby causing each antenna 90, 91 and 92 to receive each of the three signals with parameters that differ in relative amplitude S and angle $\theta$ of arrival at the other antennas. In the same way, as previously described, signals $S_2$ and $S_3$ are substantially nulled in antenna line 93 by signal controllers 100 and 103; $S_1$ and $S_3$ are substantially nulled in antenna line 94 by signal controllers 101 and 104; and, $S_1$ and $S_2$ are substantially nulled in antenna line 95 by signal controllers 102 and 105. $S_1$ is substantially all that is left in antenna line 93, $S_2$ is substantially all that is left in antenna line 94, and $S_3$ is substantially all that is left in antenna line 95.

FIG. 4 clearly shows that, in the present invention, each interference cancellation system has its reference line coupled to one transmission line and the error and output lines connected to another transmission line. The interference cancellation system and transmission lines are interconnected so that each transmission line is coupled to the output and error lines of N−1 interference cancellation systems and the reference line of N−1 other interference cancellation systems.

Therefore, with N number of antennas, N number of transmission lines and N(N−1) interference cancellation systems, N−1 number of arbitrary signals can be separated from each transmission line.

Therefore, the present invention has achieved the objective of separating a number of signals of arbitrary frequencies or modulations into a number of separate transmission lines so that each signal, desired or undesired, may be analysed.

The above-described embodiments are furnished as illustrative of the principles of this invention and are not intended to define the only embodiments possible in accordance with our teaching. Rather, protection under the U.S. Patent Law shall be afforded to use not only the specific embodiments shown but to those falling within the spirit and terms of the invention as defined by the following claims.

We claim:

1. A signal separator for separating radio frequency signals, comprising:

a pair of signal collectors, each signal collector positioned to receive a plurality of radio frequency signals of the same general frequency band at a location spaced from the other of said signal collectors;

a pair of transmission means, each of said pair of transmission means coupled to a respective signal collector to conduct the signals received from one signal collector to a respective signal utilization device; and a pair of signal cancellation means, each of said pair of signal cancellation means having reference, error input and output lines and means therein for developing the negative complement of a signal of said reference line for introduction to said output line;

a respective reference line coupled to each respective transmission means, said error input and output lines of each of said signal cancellation means being coupled to the remaining of said pair of transmission means, said output lines coupled to the respective transmission means at a point electrically closer to the respective signal collector than said reference lines and said error input lines coupled to the respective transmission means at a point electrically further from the respective signal collector than said reference lines;

each signal cancellation means substantially nulling in the transmission means coupled to its output line a predominant signal appearing in its reference line; each signal cancellation means further defining a predominant signal in the transmission means coupled to its output line and the two signal cancellation means substantially null out one signal from each transmission means.

2. The signal separator in accordance with claim 1 wherein each signal collector has different receiving characteristics to receive the plurality of radio frequency signals with different amplitudes and from a different angle of arrival.

3. The signal separator in accordance with claim 1 wherein one of said signal collectors is a monopole and the other of said signal collectors includes a pair of cross loop antennas, whereby each signal collector receives the plurality of radio frequency signals with different amplitudes and from a different angle of arrival than the other signal collector for substantially preventing self-oscillation of the two signal cancellation means.

4. The signal separator in accordance with claim 2 further comprising a vehicle for carrying the signal separator whereby the locations of the two collectors on the vehicle prevents the two collectors from receiving identical amplitude signals from identical directions.

5. A signal separator for separating a plurality of radio frequency signals, comprising:

N number of signal collectors, each signal collector receiving the plurality of signals from a location different than the other signal collectors, and N being an integer greater than 2;

N number of transmission means, each transmission means conducting the signals received from one signal collector to a signal utiliation device; and, N(N−1) number of signal cancellation means, each signal cancellation means having reference, error input and output lines, each respective reference line being coupled to one of said N number of transmission means and each corresponding error and output lines being coupled to another one of said N number of transmission means, the signal cancellation means and transmission means being interconnected so that each transmission means is coupled to the output and error lines of N−1 signal cancellation means and the reference line of N−1 other signal cancellation means, and, none of the signal cancellation means having their output and error input lines coupled to the same transmission means as their reference lines, each signal cancellation means substantially nulling in the transmission means coupled to its output line a predominant signal appearing in its reference line, further defining a predominant signal in the transmission means coupled to its output line, thus, the signal cancellation means substantially nulling out N−1 signals from each transmission means.

6. The signal separator in accordance with claim 5 wherein each said signal collector receives the plurality of radio frequency signals with different amplitudes and from a different angle of arrival than another signal collector for substantially preventing self-oscillation of the signal cancellation means.

7. The signal separator in accordance with claim 5 in which a different physical orientation is used for each of the signal collectors.

8. The signal separator in accordance with claim 7 further comprising a vehicle for support of each of the signal collectors at different respective locations thereof and which provides different fields of view for each signal collector.

9. The signal separator in accordance with claim 8 in which the signal collectors are of different types for providing different receiving characteristics.

10. The signal separator in accordance with claim 5 further including bandwidth selection means for limiting the number of signals conducted through each transmission means 11. The signal separator in accordance with claim 10 in which the bandwidth selection means for limiting the number of signals conducted through the transmission means comprises means for filtering the plurality of signals received by each of the signal collectors.

12. The signal separator in accordance with claim 5 in which N is 3.

13. A method of separating a plurality of radio frequency signals comprising the steps of:
receiving the plurality of signals from N number of different locations, N being an integer greater than 2;
conducting the signals received from each location in N number of transmission lines; and,
developing a respective negative complement of a predominant signal appearing on each of said N number of transmission lines;
combining each respective negative complement developed from each transmission line with the signals appearing on each of the remaining of said N transmission lines;
whereby a single identifiable signal is detectable on each of said N transmission lines.

14. The method of separating a plurality of signals in accordance with claim 13 further including the step of assuring that the signals received from one location differ in amplitudes and in angles of arrival from the signals received from a different location.

15. The method of separating a plurality of signals in accordance with claim 14 further including the step of limiting the number of signals conducted through the transmission lines in which a bandwidth of radio frequencies to be conducted through each transmission line is selected.

16. The method of separating a plurality of signals in accordance with claim 15 in which the step of limiting the number of signals conducted through the transmission lines comprises the steps of filtering the signals received.

17. The method of separating a plurality of signals in accordance with claim 16 in which N is 3.

* * * * *